Dec. 12, 1933.  A. R. THOMPSON  1,939,372
APPARATUS FOR HEAT TREATING PACKAGED GOODS
Filed April 23, 1930
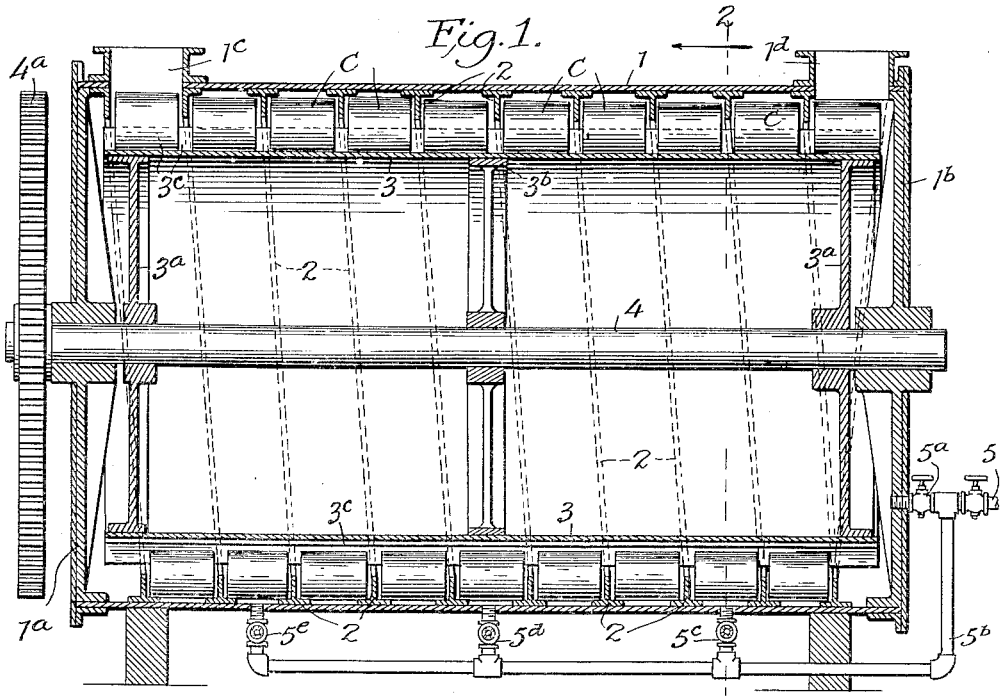
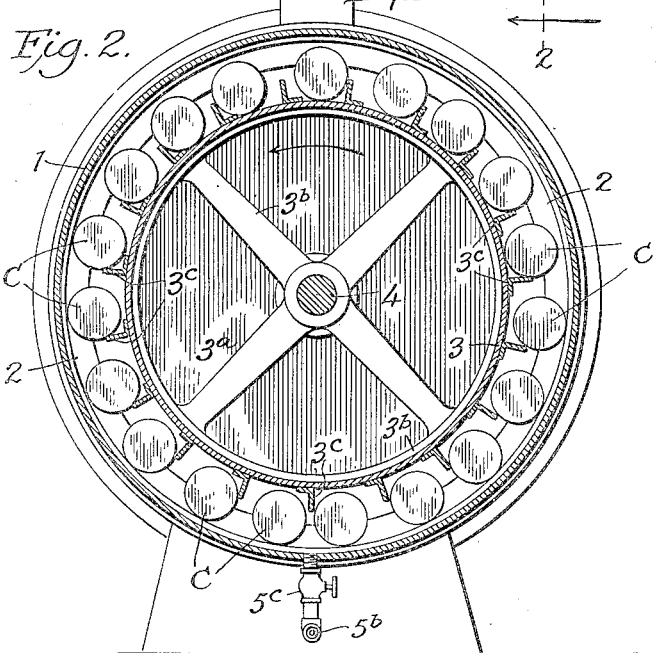

Patented Dec. 12, 1933

1,939,372

UNITED STATES PATENT OFFICE 1,939,372

APPARATUS FOR HEAT TREATING PACKAGED GOODS

Albert R. Thompson, San Jose, Calif., assignor to Anderson Barngrover Mfg. Co., San Jose, Calif., a corporation of California Application April 23, 1930. Serial No. 446,575

1 Claim. (Cl. 126—272)

This invention relates to apparatus for heat treating packaged goods commonly called can cooking machines of the type shown, for example, in my Patents No. 1, 498,765; No. 1,499,038; and No. 1,721,753.

The principal object of my invention is to simplify the construction of such apparatus and lessen the amount of heating medium required. Subsidiary objects are to provide an apparatus whereby the goods can be subjected to a uniform temperature while passing therethrough as may be required for cooking or for cooling the goods, or to a graduated temperature such as is frequently required in so-called "pre-tempering" and in sterilizing the goods; the apparatus being usable for sterilizing, or for cooking, or for preheating preparatory to cooking, or for cooling the goods passing therethrough. A further object is to provide improved means for supporting and forwarding cans through the spiral guideway in the apparatus. Other objects and advantages of the invention will be hereinafter disclosed.

The accompanying drawing illustrates one practical form of apparatus embodying the invention, and I will describe the same with reference thereto to enable others skilled in the art to adopt and use the same, and summarize the essentials of the invention and novel features of construction and novel combinations of parts in the appended claim.

In the accompanying drawing;

Fig. 1 is a longitudinal sectional elevation of one form of apparatus embodying the invention.

Fig. 2 is a transverse section on line 2—2, Fig. 1.

The apparatus shown comprises a tank composed of a preferably cylindric body 1 closed at its ends by suitable headers 1a, 1b. The tank may be of any desired diameter and length, and is preferably water and steam tight, and has an inlet 1c and an outlet 1d which may be provided with suitable valves through which the containers C, usually cylindric cans containing the goods to be treated, are introduced into the tank and removed therefrom. Any suitable feeding and delivery devices may be employed. If the temperature is to be above 210° F. I preferably employ a substantially steam tight feed and discharge device, but if the temperature is to be less than 210° the feed and discharge devices need not be steam tight. If desired the cans could be fed to the cooker by apparatus such as shown in my Patents No. 1,467,960; No. 1,729,633; or No. 1,564,150; and could be discharged therefrom by devices such as shown in my Patents No. 1,467,960 or 1,422,798.

Within the tank is a spiral can guideway formed by a helical rail 2, such as shown in my aforesaid patents, which may be attached to the inner wall of the tank body 1. Said guideway is adapted to guide cans C from the inlet 1c to the outlet 1d.

Within the spiral guideway and cooperating therewith is a cylindric drum 3 which is of slightly less diameter than the spiral guideway and extends approximately from end to end thereof within the tank. This drum is preferably composed of a cylindric sheet metal shell attached to heads 3a which support the shell or drum proper upon an axially disposed shaft 4 that extends through the drum and is journaled in axial bearings in the heads 1a and 1b of the tank. If desired the drum can be stiffened intermediate the heads 3a by means of intermediate members 3b, one being shown in the drawing, which may be imperforate disks like the heads, or may be spoked as indicated in Fig. 2. The cylindric shell stiffens the central part of the drum in extremely long cookers, and eliminates sagging which sometimes takes place in long cookers using the standard reel construction.

Preferably the drum is imperforate and practically steam and water tight, and it should be of such diameter that a can C resting on top of the drum will project between adjacent spirals of the rail 2; and when the guideway is filled with cans they practically close the annular space between the periphery of the drum 3 and the inner periphery of the body 1 of the tank, as indicated in Figs. 1 and 2.

Disposed longitudinally of the drum are longitudinal ribs or flanges 3c which may be L-bars fastened to the shell 3. These ribs space the cans apart around the periphery of the drum and will cause the cans to move around with the drum; and the helical rail 2 will cause the cans to slide lengthwise of the drum as they move around therewith; thus the cans are successively traversed through the guideway from the inlet to the outlet of the tank, as set forth in my aforesaid patents.

By having the drum water-tight exchange of liquid from one end of the tank to the other is prevented, especially when the guideway is filled with cans, and this enables a gradual increase of temperature from the feed to the discharge end to be obtained.

The drum may be heated by any suitable means. As shown steam can be introduced into the discharge end thereof through a pipe 5 connected with any convenient source of supply, and controlled by a valve 5a. A pipe 5b connected with pipe 5 preferably extends lengthwise of the drum and is connected therewith by branch pipes at any desired point or points; three branch pipes are indicated in Fig. 1 respectively controlled by valves 5c, 5d, 5e.

The drum may be rotated by any desired means. As shown shaft 4 has a gear 4a on one end which may mesh with any suitable driving gear (not shown) for example such as indicated in my Patent No. 1,694,996.

The drum takes the place of the ordinary skeleton reel, and will prevent direct or rapid flow of heat or steam from the discharge end to the feed end of the tank.

For sterilizing or preheating purposes steam can be admitted through the inlet pipe 5 at the discharge end of the apparatus, but due to the presence of the cans in the guideway the travel of heat from the discharge end to the feed end of the apparatus will be retarded to such an extent that it is possible to hold the inlet or feed end of the tank at any desired temperature; also to gradually increase the temperature toward the outlet where it would be highest.

While there are no specific heat zones in the apparatus, nevertheless, it is possible to maintain a gradual increase of temperature from the feed to the discharge end in the apparatus. The temperature along the length of the apparatus can be regulated by adjusting the valves 5e, 5d, 5c to suit conditions.

In practice as a preheater the apparatus would be operated with a gradually increasing heat from the feed end to the discharge end, the feed end being maintained at substantially 90° F. temperature and the discharge end at from 200° to 210° F.

The cans usually enter the heat treating apparatus at a temperature of approximately 40° F., and as they advance toward the hotter end they absorb the heat from the surrounding heated atmosphere or liquid, and thus the cans assist in holding the initial end of the cooker at the low temperature desired in sterilizing or preheating.

Where there is a free circulation of liquid through the reel, as in the ordinary construction, currents are freely set up from end to end of the apparatus, which tend to very quickly unify the temperature throughout the whole tank. But in my improved apparatus direct communication is practically prevented between opposite ends of the apparatus by the drum, the spiral guide rail secured to the inner wall of the tank and the cans filling the guideway.

The drum supports the cans and causes them to traverse the guideway irrespective of whether or not the space in the tank exterior to the drum is heated uniformly throughout or whether it contains heat zones of different temperatures. If the drum is imperforate it obviously prevents easy interchange of temperatures throughout its length. Also where liquid is used in the tank as a heating medium having the drum water tight materially reduces the amount of liquid required to maintain the liquid level in the tank at the desired height.

Preferably the heating medium, or liquid surrounding the cans, is confined between the inner wall of the tank and the outer wall of the drum and is not permitted to enter the drum.

While I have above described the apparatus as used for preheating or for sterilizing purposes, in which it is desirable to have different temperatures or different zones of temperature in the tank, it is obvious that by properly adjusting the valves a uniform temperature can be maintained throughout the length of the tank; so that if desired the cans may be introduced into a cooking temperature when they first enter the tank. If it is desired to use the apparatus to cool the cans, a cooling medium could be introduced into the tank in place of a heating medium and in such cases the supply valves could be so arranged that a uniform cool temperature is maintained in the tank; or the coolest temperature could be maintained adjacent the discharge end of the tank.

From the foregoing description it is obvious that the apparatus is adapted for use as a preheater, or as a sterilizer, or as a cooker, or as a cooler. If it is desired to have the preheater or sterilizer, cooker and cooler separate but used in sequence, the described apparatus may be duplicated, as desired, and one used for the preheater, another for the cooker, and another for the cooler. In some cases a single apparatus embodying the invention might be made sufficiently long to enable two or more of the aforesaid operations to be performed in sequence upon the cans moving through the tank.

It should be understood that by the word cans, as used in the specification and claim, I mean to include any container or package containing goods to be heat treated which can be traversed through the guideway in the manner hereinabove set forth.

I claim:

In apparatus for heat treating canned goods; a tank circular in cross-section and having an inlet and an outlet at opposite ends thereof; a rotatable water-tight drum circular in cross-section disposed axially and longitudinally of and within the tank, the space between the walls of the tank and drum forming an annular hot water chamber of uniform radial width surrounding the drum, the width of said chamber at all points approximating the diameter of the largest cans passable therethrough; a spiral can guideway within the said chamber and directly attached to the inner wall of the tank and extending from the inlet to the outlet; parallel bars arranged longitudinally of the drum and mounted on and fixedly attached to the periphery of said drum within the chamber, and adapted to propel cans along the guideway and through said annular water chamber as the drum is rotated; and means for introducing heating fluid into the annular water chamber at spaced points in the length thereof.

ALBERT R. THOMPSON.